United States Patent [19]

Iyengar et al.

[11] Patent Number: 5,768,558

[45] Date of Patent: Jun. 16, 1998

[54] IDENTIFICATION OF THE DISTINCTION BETWEEN THE BEGINNING OF A NEW WRITE BACK CYCLE AND AN ONGOING WRITE CYCLE

[75] Inventors: Sundaravarathan R. Iyengar, San Jose; Mustafiz R. Choudhury, Sunnyvale, both of Calif.

[73] Assignee: Intel Corporation, Santa Clara, Calif.

[21] Appl. No.: 734,728

[22] Filed: Oct. 21, 1996

Related U.S. Application Data

[63] Continuation of Ser. No. 297,696, Aug. 29, 1994, abandoned.

[51] Int. Cl.$^6$ .................................................. G06F 12/08
[52] U.S. Cl. .......................... 395/470; 395/469; 395/471; 395/473
[58] Field of Search .......................... 395/470, 469, 395/473, 471

[56] References Cited

U.S. PATENT DOCUMENTS

| | | | |
|---|---|---|---|
| 5,185,878 | 2/1993 | Baror et al. | 395/450 |
| 5,287,481 | 2/1994 | Lin | 395/462 |
| 5,301,287 | 4/1994 | Herrell et al. | 395/412 |
| 5,317,720 | 5/1994 | Stamm et al. | 395/470 |
| 5,335,335 | 8/1994 | Jackson et al. | 395/448 |
| 5,347,648 | 9/1994 | Stamm et al. | 395/182.03 |
| 5,353,415 | 10/1994 | Wolford et al. | 395/306 |
| 5,353,423 | 10/1994 | Hamid et al. | 395/470 |
| 5,463,753 | 10/1995 | Fry et al. | 395/473 |
| 5,469,555 | 11/1995 | Ghosh et al. | 395/460 |
| 5,485,592 | 1/1996 | Lau | 395/470 |
| 5,517,626 | 5/1996 | Archer et al. | 395/290 |

*Primary Examiner*—Eddie P. Chan
*Assistant Examiner*—Reginald G. Bragdon
*Attorney, Agent, or Firm*—Blakely, Sokoloff, Taylor & Zafman

[57] ABSTRACT

A computer system includes a microprocessor having an internal cache memory and control unit that performs writeback operations to external memory responsive to an external signal indicating that a valid external address has been driven onto the address pins of the microprocessor. Under control of a state machine control, a unit within the microprocessor provides an indication signal to the external component that a current write cycle is a write-back cycle; this enables the system to distinguish between an ongoing write cycle generated by the processor, and a new write-back cycle. An additional signal is generated by the microprocessor in the event that the external address indicates a cache hit to a modified line.

11 Claims, 8 Drawing Sheets

5,768,558

IDENTIFICATION OF THE DISTINCTION BETWEEN THE BEGINNING OF A NEW WRITE BACK CYCLE AND AN ONGOING WRITE CYCLE

This is a continuation of application Ser. No. 08/297,696, filed Aug. 29, 1994, now abandoned.

FIELD OF THE INVENTION

The present invention relates to the field of electronic data processing devices. More particularly, the present invention relates to the transfer of information between a data processor and external memory to update external memory.

BACKGROUND OF THE INVENTION

Processors currently update external memory in either a write-through mode or a write-back mode. One prior microprocessor updates external memory utilizing a write-through mode. Another prior microprocessor updates external memory utilizing a write-back mode. The use of write-back processors is desirable for systems that can accept write-backing because of the amount of individual writes to external memory is minimized. Thus, performance of the system is enhanced.

However, when a write-back processor is utilized and the processor transfers data in a non-burst mode, existing computer systems are unable to distinguish the start of a new write-back from an ongoing write cycle. It is important that computer systems be able to distinguish the two because the computer system has to perform different operations depending on whether the beginning of a write-back, or the beginning of an individual write, occurs.

In addition, when a write-back processor is utilized, the processor can perform the write-back operation in a variety of different ways. However, the computer system needs to know in advance how the write-back will be performed so that it can perform its operations accordingly.

Therefore, what is needed is a processor that functions in a manner which allows the computer system to distinguish between the beginning of a write-back and the beginning of an individual write that is part of an ongoing write cycle.

What is also needed is a processor which performs a write-back cycle in accordance with a specified protocol.

SUMMARY OF THE INVENTION

A processor capable of indicating the beginning of a write-back cycle for transferring data between cache memory and external memory is described. In one embodiment, the processor comprises a bus unit for transmitting and receiving data, addresses and control signals from an external bus. It also comprises a cache memory for storing data and addresses, a control unit for performing a write-back cycle that transfers data between the cache memory and external memory, and an indicator unit for indicating the beginning of the write-back cycle. In addition, the processor is capable of generating a first signal state in the same clock cycle as the start of a write-back cycle and generated a second signal state after the transfer of a first data packet of the write cycle. Moreover, the processor is capable of indicating the beginning of a replacement write-back cycle for transferring data between cache memory and external memory. Furthermore, the processor is capable of indicating the beginning of an external snoop write-back cycle for transferring data between cache memory and external memory.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A novel processor having an indicator for indicating the beginning of a write-back cycle is described. In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
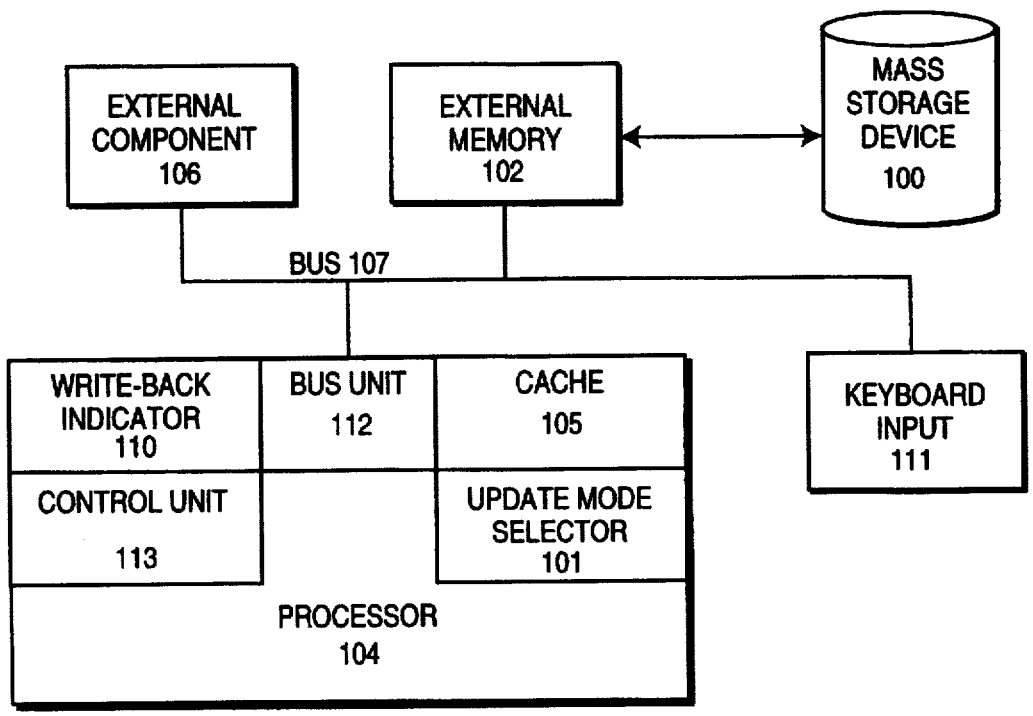
FIG. 1 illustrates in block diagram form a computer system of one embodiment of the present invention.

FIG. 1 illustrates in block diagram form a computer system of one embodiment of the present invention. The computer system includes mass storage device 100, external memory 102, keyboard input 111 and processor 104. The computer system can also include external component 106 coupled with a bus 107. External memory 102 can be a random access memory device (RAM) or an external cache memory. Keyboard input 111 allows a keyboard to be coupled to the computer system. Mass storage device 100 can be a floppy disk drive, hard disk drive, CD-ROM drive or flash memory device. Mass storage device 100 is coupled to external memory 102 and external memory 102 is in turn coupled to bus 107. External component 106 and processor 104 are also coupled to bus 107. Processor 104 transfers information to external memory 102 and component 106 via bus 107. External memory 102 and component 106 also transfer information to processor 104 via bus 107.

Processor 104 includes update mode selector 101, cache 105, write-back indicator 110, bus unit 112 and control unit 113. Write-back indicator 110 indicates the start of a write-back cycle every time a write-back cycle is initiated by processor 104. Update mode selector 101 selects the mode used to update external memory. Update mode selector 101 can reside in control unit 113 or can reside separately from control unit 113 in processor 104. Bus unit 112 transmits data, addresses, and control signals over bus 107. It also receives data, addresses, and control signals from bus 107. Control unit 113 controls and synchronizes all data transfers and transformations in processor 104. Write-back indicator 110 can reside in control unit 113 or can reside separately from control unit 113 in processor 104.

Processor 104 can incorporate two or more of the following modes of updating external memory. The first mode of updating external memory is the write-through mode. Under the write-through mode, all memory writes by processor 104 into cache 105 are immediately passed along to external memory. The result is that external memory always contains valid data. The second mode of updating external memory is the buffered write-through mode. Under the buffered write-through mode, processor 104 performs memory writes into cache 105 and then passes the memory writes along to external memory if bus 107 is available. However, when bus 107 is unavailable, cache 105 buffers the memory writes to be passed along. The buffering by cache 105 frees processor 104 to continue its processing operations. When bus 107 becomes available, cache 105 independently completes the writes to external memory from the buffer. The third mode of updating external memory is the write-back mode. Under the write-back mode, processor 104 performs memory writes into cache 105 and a modified dirty (altered) bit is set for all locations affected by the memory writes. Cache 105 does not immediately pass along the memory write even if bus 107 is available. Instead the information is kept solely in cache 105 until information is requested by another processor 104 in the system or by component 106. At that point, cache 105 updates external memory with the information if the modified dirty (altered) bit is set for that location. Alternatively, the system could issue a cache flush instruction, at which point, cache 105 updates external memory with all information in all locations where the modified dirty (altered) bit is set. Other modes of updating external memory can be incorporated into processor 104 as well.

Figure 2:
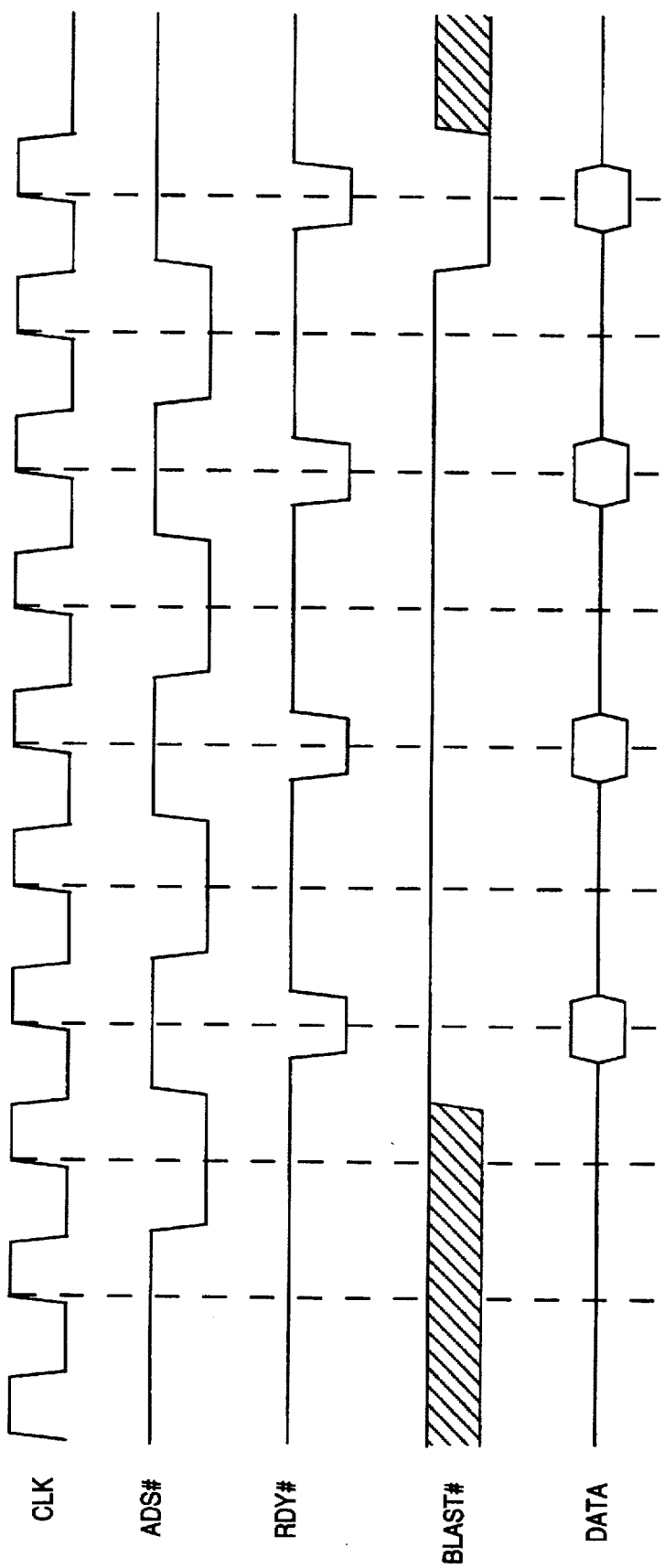
FIG. 2 illustrates in the form of a timing diagram the non-burst mode of transferring data.

In addition, processor 104 can transfer information in a non-burst mode or a burst mode. FIG. 2 illustrates in the form of a timing diagram the non-burst mode of transferring data. In the non-burst mode, the processor transfers data in individual write operations. Each write operation is independent and distinct from the other. The number of write operations necessary to accomplish the transfer depends on the size of data being transferred and the size of data transferred in each write cycle. For instance, if 16 bytes is to be transferred by the processor and each write operation transfers four bytes, then four write cycles are required to transfer the entire 16 bytes of information.

The processor initiates the transfer of data in this mode by first asserting an address status signal (ADS#) which occupies one clock time and indicates that a valid bus cycle definition and address are available on the cycle definition lines and address bus. Examples of bus cycle definition signals include a signal (M/IO#) to indicate whether the existing cycle is a memory or input-output, a signal (D/C#) to indicate whether the existing cycle is a data or control cycle and a signal (W/R#) to indicate whether the existing cycle is a write or read cycle. Other bus cycle definition signals include a signal (PLOCK#) indicating that the current bus transaction requires more than one bus cycle to complete, and a signal (LOCK#) indicating that the current bus cycle is locked. Because the ADS# signal is an active low signal, the processor asserts the signal by transmitting a low signal state. After the processor asserts the ADS# signal, it transfers data for one write operation which also occupies one clock time. Then the processor asserts another ADS# signal and transfers data for another write operation. The steps are repeated until completion of data transfer. In the example described above, the processor transfers four bytes in each write operation. Four write operations are required to transfer the total of 16 bytes. Since four write operations are required, the processor asserts four ADS# signals each occupying one clock period. It also transfers data four times each also requiring one clock time. Thus, the processor utilizes a minimum of eight clock times to complete the transfer of 16 bytes.

Figure 3:
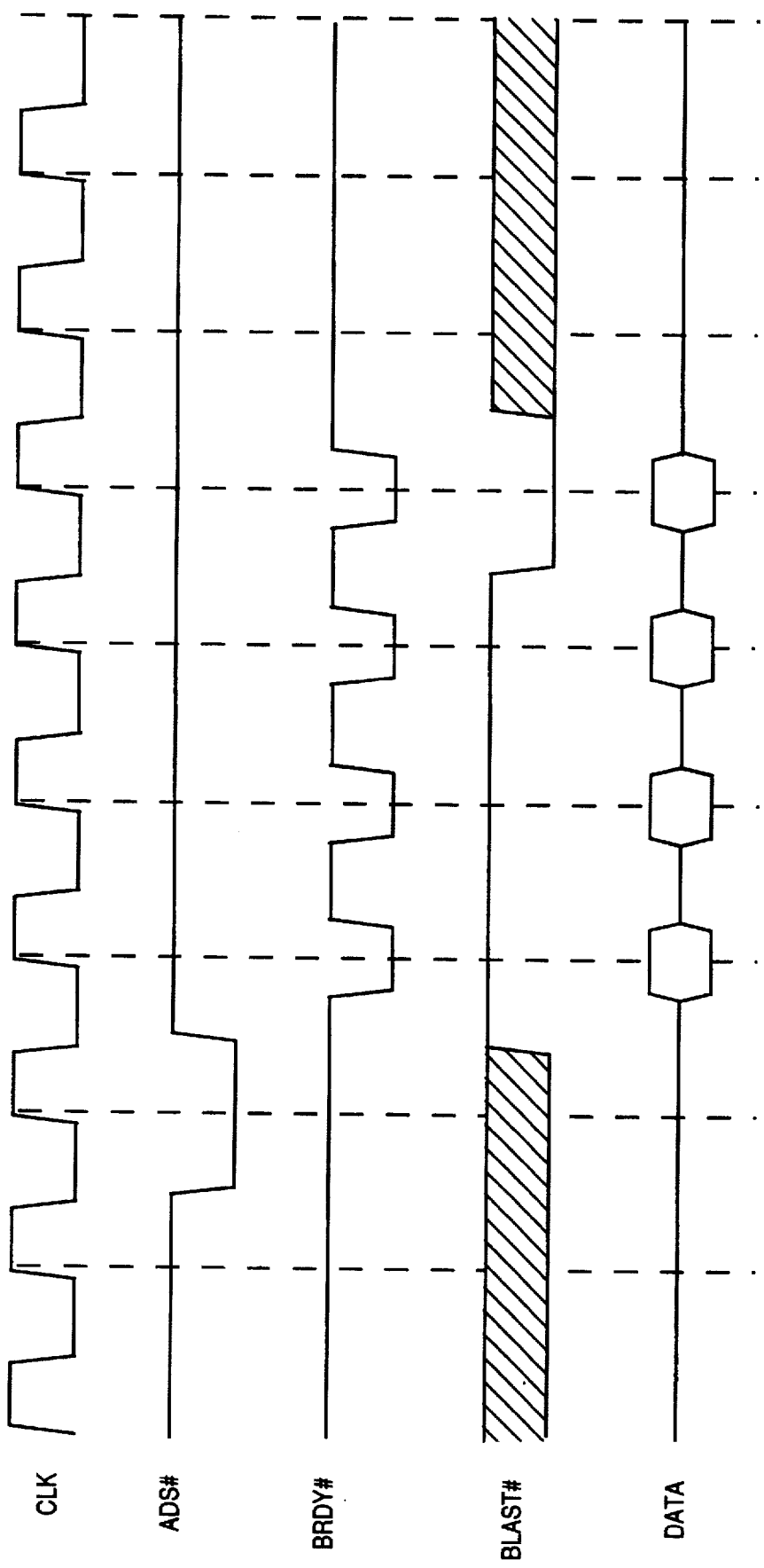
FIG. 3 illustrates in the form of a timing diagram the burst mode of transferring data.

FIG. 3 illustrates in the form of a timing diagram the burst mode of transferring data. In the burst mode, the processor transfers data in a single burst transaction. The processor initiates the single burst transaction by asserting an ADS# signal. The assertion of the ADS# signal occupies one clock time as in the non-burst mode. After the processor asserts the ADS# signal, it transfers data. However, the transfer of data may be broken into separate increments depending on the total size of data transferred and the size of data transferred in each increment. Each transfer of a data increment requires one clock time. Using the example described above, a transfer of 16 bytes with four bytes transferred per increment requires four increments as illustrated in FIG. 3. However, unlike in the non-burst mode, the processor only asserts one ADS# signal at the beginning of the burst transaction. After the ADS# signal, the processor transfers data in four increments of four bytes each. Thus, the processor utilizes a minimum of five clock times to complete the transfer of 16 bytes.

When update mode selector 101 selects the write-back mode and processor 104 also utilizes a non-burst mode of transferring information, write-back indicator 110 allows computer systems designed for non-burst processors to distinguish between the start of a new write-back from an ongoing write cycle or write-back cycle. The computer systems are able to distinguish between the start of a new write-back from an ongoing write cycle by a signal transmitted on bus 107 by write-back indicator 110. This feature allows the computer systems to perform operations which require the ability to distinguish between the two. One such operation is writing an entire line of four individual write cycles during a write-back to a buffer and transferring the entire line as a whole to memory. The computer system has to distinguish the beginning of a write-back because it indicates the beginning of a line. This operation allows for performance advantages over the alternative of writing data in individual write cycles directly to memory four separate times.

Figure 4:
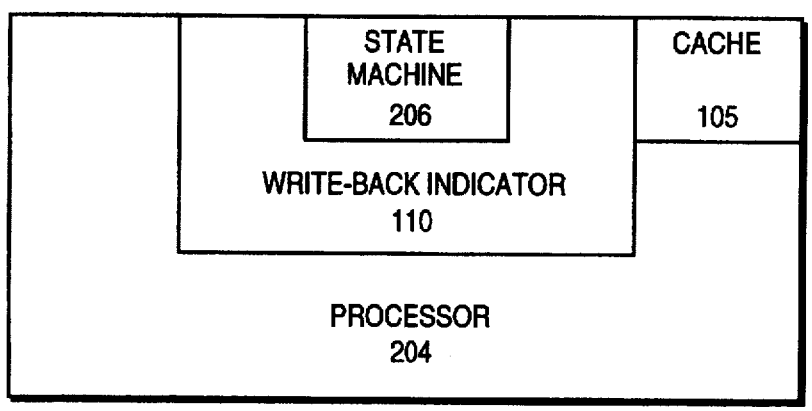
FIG. 4 illustrates in block diagram form a processor of a second embodiment of the present invention.

FIG. 4 illustrates in block diagram form a processor of a second embodiment of the present invention. In this embodiment, processor 204 is comprised of cache 105 and state machine 206. State machine 206 is incorporated into write-back indicator 110. State machine 206 transmits a signal on bus 107 at the beginning of a write-back.

Figure 5:
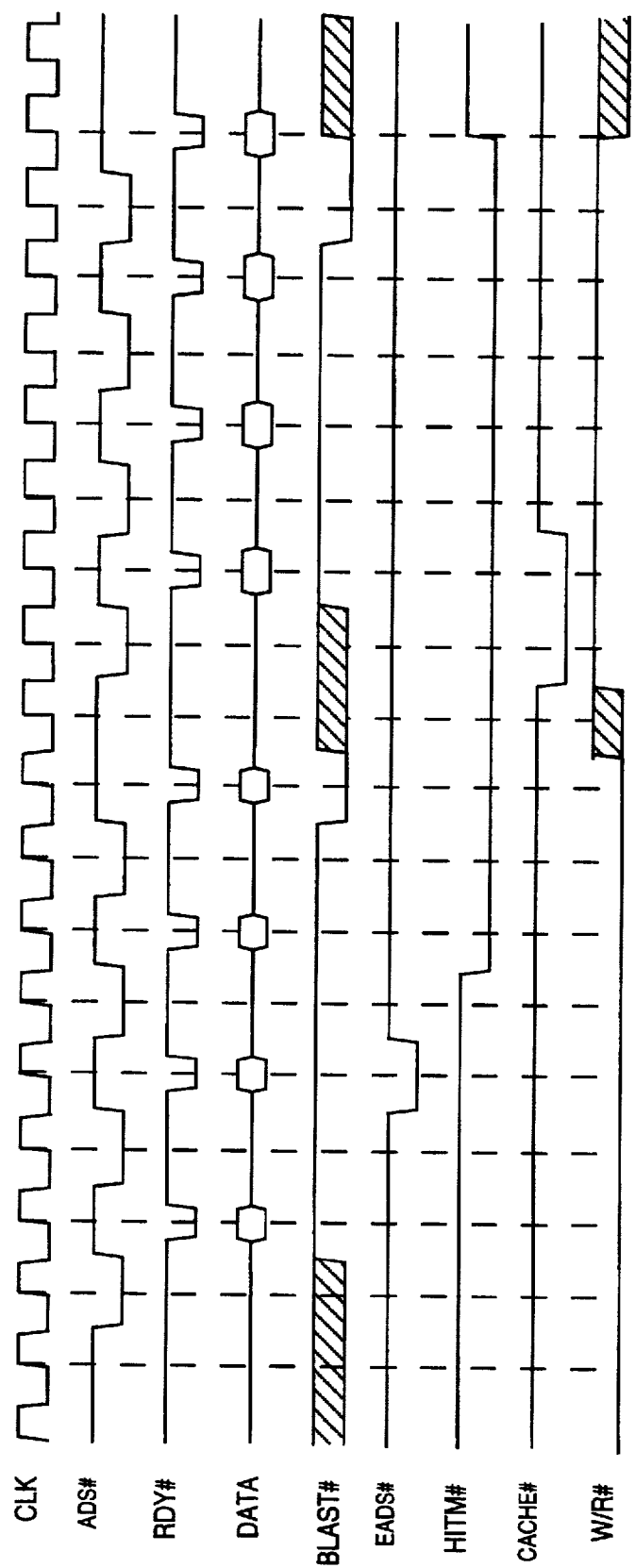
FIG. 5 illustrates in timing diagram form the operation of the state machine of FIG. 4.

FIG. 5 illustrates in timing diagram form the operation of the state machine of FIG. 4. As shown in FIG. 5, each write of a non-burst write cycle is preceded by an active low address status (ADS#) signal at least one clock before the write. In this embodiment, the ADS# signal precedes the write by one clock cycle. The ADS# signal is asserted on bus 107 by state machine 206 in processor 204 and indicates that processor 204 is ready to transfer data. When the computer system needs information in cache 105, a write-back to external memory has to be performed by processor 204 from cache 105. The computer system initiates a write-back by asserting an active low external address status (EADS#) signal. The EADS# signal indicates that a valid external address has been driven onto the address pins of processor 204. If cache 105 has the information desired by the computer system and the information has been modified, it performs a write-back of the information to external memory. However, the computer system may assert the EADS# signal while processor 204 is in the middle of a write cycle as illustrated in FIG. 5. Because processor 204 is in the middle of a write cycle, it does not perform the write-back until after the write cycle is completed. During the last individual write of the write cycle, processor asserts an active low BLAST# signal in the same clock cycle that the last data packet is transmitted. The BLAST# signal indicates that the write-cycle is complete after the data packet is transmitted. When processor 204 does perform the write-back, it asserts the same ADS# signal as when it performs an individual write of a write cycle. The computer system is able to distinguish between the start of a new write-back cycle from an ongoing write cycle because state machine 206 asserts an active low CACHE # signal during the same clock the first ADS# of a write-back is asserted. The CACHE# signal indicates that the current write cycle is a write-back cycle. The processor then transfers data in the next clock as shown in FIG. 5. State machine 206 deasserts the CACHE# signal after the transfer of the first data packet and keeps the CACHE# signal deasserted until the beginning of the next write-back.

Under the third embodiment of the present invention, state machine 206 also generates a HITM# signal and a W/R# signal. The active low HITM# signal is asserted by state machine 206 after an EADS# signal when the address accompanying the EADS# signal is in cache 105 and has been modified. In this embodiment, HITM# is asserted two clock cycles after the EADS# signal. Thus, the assertion of the HITM# signal indicates a cache hit to a modified line. If the address is not in cache 105 or has not been modified, the HITM# signal is not asserted. After processor 204 initiates a write-back of information associated with the address, HITM# is deasserted as shown in FIG. 5. Here, HITM# is deasserted in the same clock cycle that the write-back is completed. On the other hand, the W/R# signal is asserted low by state machine 206 when processor 204 is performing a read and asserted high when processor 204 is performing a write operation. In this example, W/R# is asserted high in the same clock cycle that the first ADS# signal of the write-back is asserted. It is asserted low in the same clock cycle that the write-back is completed.

Under the third embodiment, processor 204 asserts and deasserts four signals: ADS#, CACHE#, W/R# and HITM#. Because of the four signals, the computer system can not only distinguish the start of a new write-back cycle from an ongoing write cycle but also can distinguish between different write-backs. Under the third embodiment, processor 204 performs two different types of write-backs. The first type is a replacement write-back. A replacement write-back occurs when processor 204 pulls information from external memory to put in cache 105 while cache 105 is full. To create memory capacity in cache 105 for the new information, processor 204 performs a write-back of existing information in cache 105 to external memory and replaces the existing information with new information from external memory. The second type is an external snoop write-back. An external snoop write-back occurs when another processor or other external component requests information in which the most recent version resides in cache 105. To allow access to the desired information, processor 204 performs a write-back of the information to external memory. The other processor or other external component can then access the information from external memory.

The computer system can determine the beginning of a replacement write-back and an external snoop write-back by examining the signal state of the four signals, ADS#, CACHE#, W/R# and HITM#. When ADS# is asserted low, this indicates to the computer system that the processor is ready for a data transfer. When W/R# is asserted high at the same time, this indicates to the computer system that the data transfer is a write. When CACHE# is asserted low at the same time, this indicates to the computer system that the write is the start of a new write-back instead of an ongoing write cycle. If HITM# is asserted low, this indicates to the computer system that the write-back is an external snoop write-back. On the other hand, if HITM# is asserted high, this indicates to the computer system that the write-back is a replacement write back.

Figure 6:
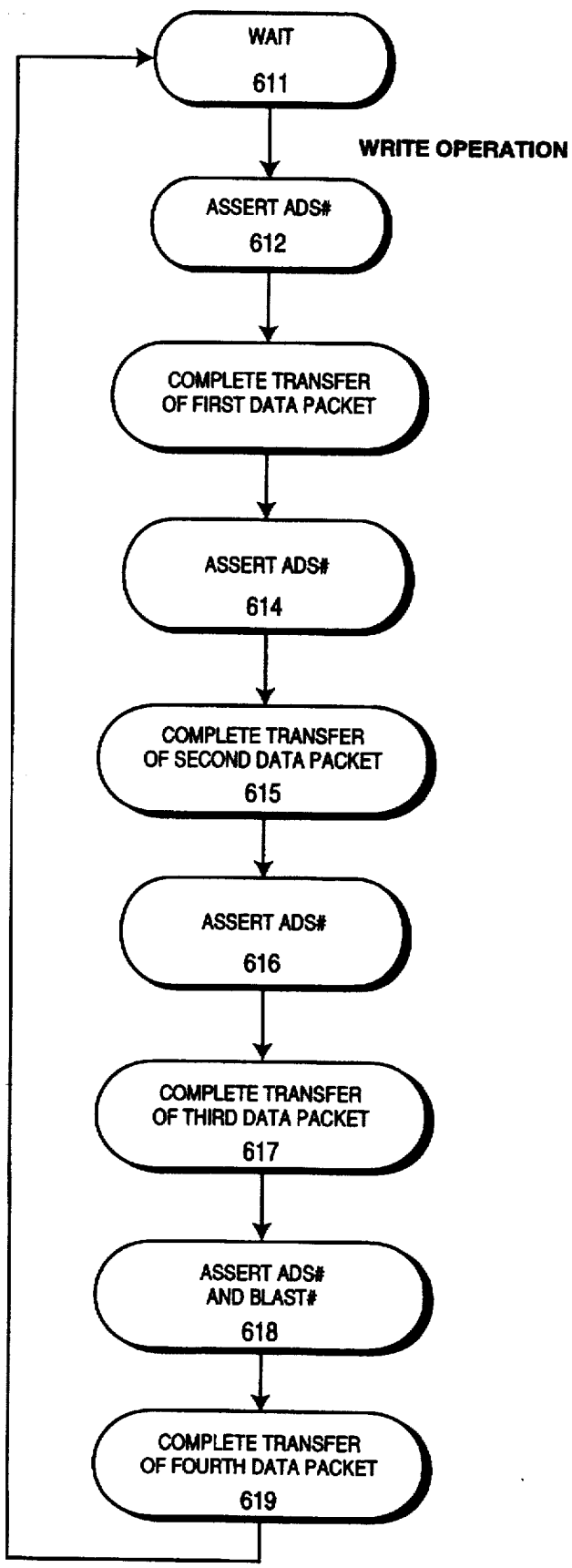
FIG. 6 illustrates in state diagram form the operation of the state machine of FIG. 4.

FIG. 6 illustrates in state diagram form the operation of the state machine of FIG. 4. State machine 206 powers up in WAIT state 611 where it remains until a write operation occurs. When a write operation occurs, state machine 206 transitions to state 612 where it asserts an ADS# signal. It then transitions to state 613 where it completes the transfer of the first data packet of the write cycle. The first ADS# signal and the first data packet constitutes the first individual write of the write cycle. After state 613, state machine 206 transitions to state 614 where it asserts a second ADS# signal. It then transitions to state 615 where it completes the transfer of the second data packet of the write cycle. The second ADS# signal and the second data packet constitutes the second individual write of the write cycle. After state 615, state machine 206 transitions to state 616 where it asserts the third ADS# signal. It then transitions to state 617 where it completes the transfer of the third data packet. Again, the third ADS# signal and the third data packet constitutes the third individual write of the write cycle. After state 617, state machine 206 transitions to state 618 where it asserts the fourth ADS# signal. It then transitions to state 619 where it completes the transfer of the fourth data packet thus completing the fourth individual write of the write cycle. After state 619, state machine 206 transitions back to WAIT state 611.

Figure 7:
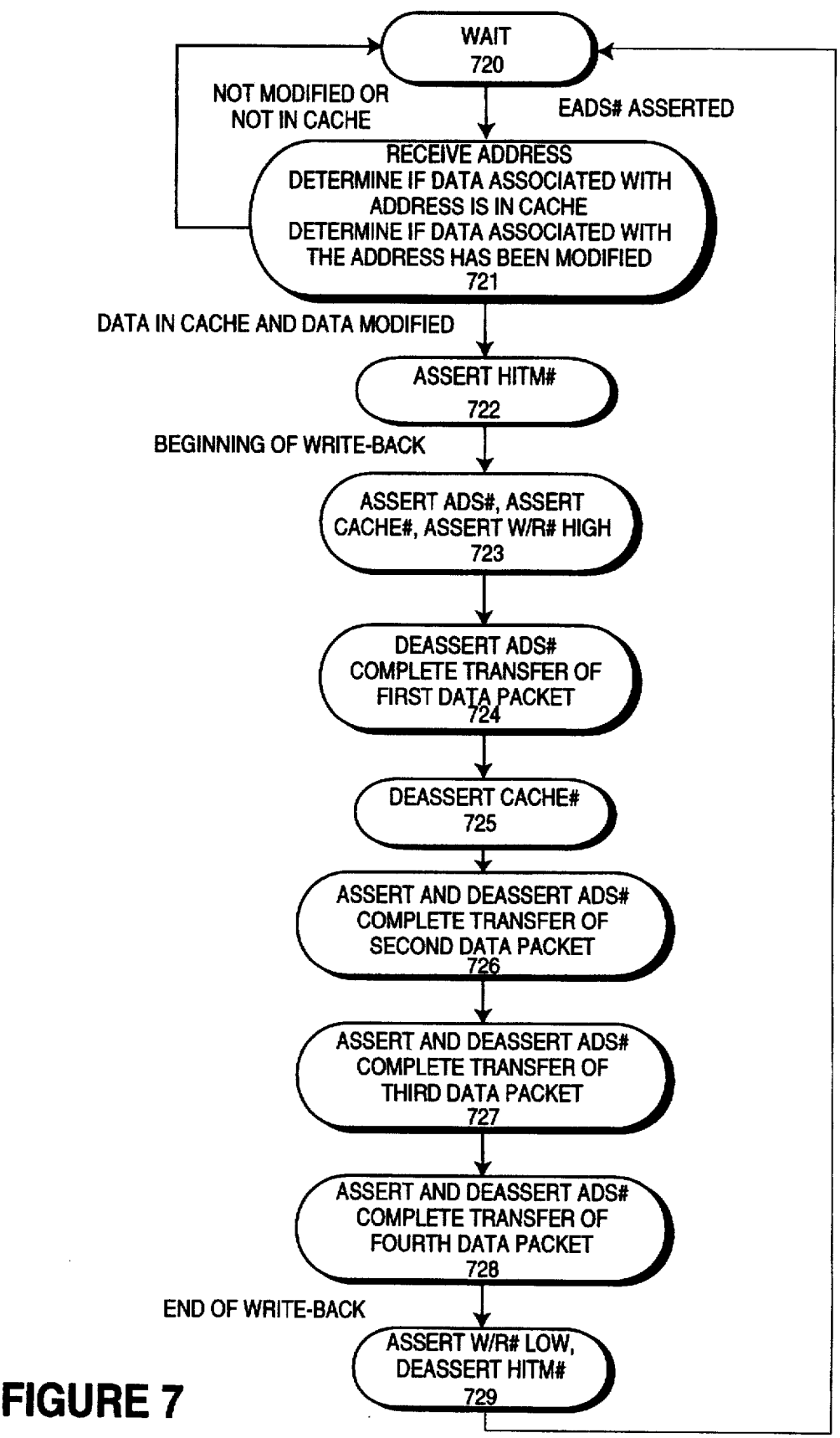
FIG. 7 illustrates in state diagram form the write-back operation of the state machine of FIG. 4.

FIG. 7 illustrates in state diagram form the write-back operation of the state machine of FIG. 4. State machine 206 powers up in WAIT state 720. It remains in state 720 until an EADS# signal is asserted by the computer system. When state machine 206 receives the EADS# signal, it transitions to state 721 where it receives the address associated with the EADS# signal. It also determines if the data associated with the address is in cache memory and determines if the data associated with the address has been modified. If the data has not been modified or is not in cache memory, state machine 206 transitions back to WAIT state 720. On the other hand, if the data is in cache memory and has been modified, state machine 206 transitions to state 722. In state 722, state machine 206 asserts the HITM# signal. It remains in state 722 and continues to assert the HITM# signal until the beginning of the write-back of the data from cache memory to an external memory. During the same clock cycle as the beginning of the write-back, state machine 206 transitions to state 723 where it asserts the ADS# signal and asserts the CACHE# signal. Because the write-back cycle is a write cycle, state machine 206 also asserts the W/R# signal high. State machine 206 then transitions to state 724 where it deasserts the ADS# signal and completes transfer of the first data packet. State machine 206 then transitions to state 725 where it deasserts the CACHE# signal. State machine 206 then transitions to state 726 where it asserts and deasserts the ADS# signal and also completes transfer of the second data packet. State machine 206 then transitions to state 727 where it asserts and deasserts the ADS# signal and also completes transfer of the third data packet. State machine 206 then transitions to state 728 where it asserts and deasserts the ADS# signal and also completes transfer of the fourth data packet. At the end of the write-back cycle, state machine 206 transitions to state 729 where it asserts the W/R# signal low and deasserts the HITM# signal. State machine 206 then transitions back to WAIT state 720.

Figure 8:
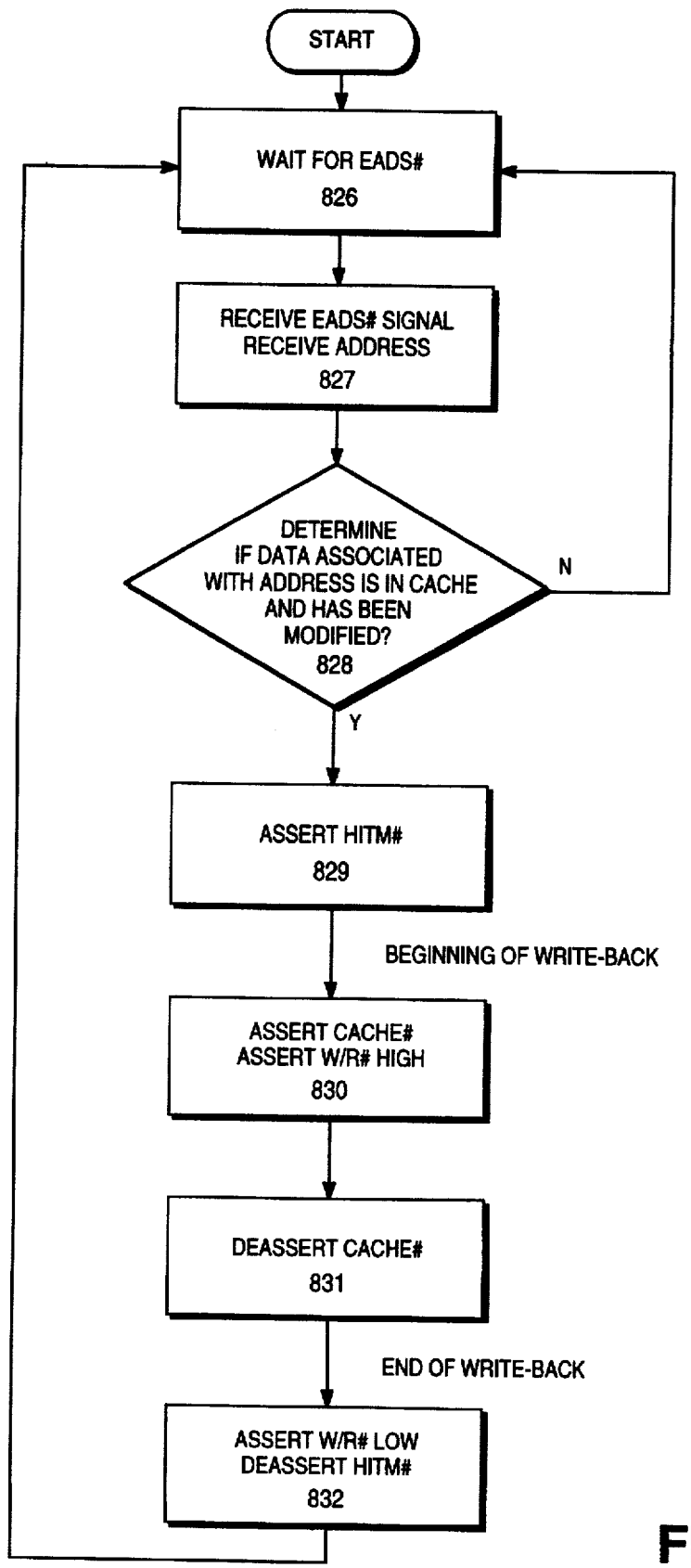
FIG. 8 illustrates in flow chart diagram form the write-back operation of the state machine of FIG. 4.

FIG. 8 illustrates in flow chart diagram form the write-back operation of the state machine of FIG. 4. When processor 204 is powered up, state machine 206 waits for the first EADS# signal as shown in block 826. When an EADS# signal is transmitted by the computer system, state machine 206 receives the EADS# signal and receives the address associated with the signal as shown in block 827. State machine 206 then determines if the data associated with the address is in cache memory and determines if the data has been modified as shown in block 828. If the data is not in cache memory or has not been modified, state machine 206 returns to block 826. On the other hand, if the data is in cache memory and has been modified, state machine 206 asserts the HITM# signal as shown in block 829. State machine 206 continues to asserts the HITM# signal until the write-back of the data from cache memory is completed. At the beginning of the write-back cycle, state machine 206 asserts the CACHE# signal and asserts the W/R# signal high as shown in block 830. After the transfer of the first data packet, state machine 206 deasserts the CACHE# signal as shown in block 831. It then performs the rest of the write-back of the data from cache memory. It asserts the W/R# signal low and deasserts HITM# as shown in block 832. It then returns back to the WAIT state as shown in block 826.

Under a fourth embodiment, processor 104 performs a write-back cycle in a defined order. In this embodiment, four individual write operations are used to transfer a total of 16 bytes. Thus, each data packet in an individual write operation consists of four bytes. Under the ordering scheme utilized by processor 104, processor 104 transfers four bytes at a time starting with byte zero through byte three. It then transfers bytes four through seven, followed by bytes eight through eleven and ending with bytes twelve through fifteen. Thus, in a write-back, processor 104 transmits the following address sequence: 0×0, 0×4, 0×8 and 0×C. This particular ordering sequence has the benefit of allowing for less complicated circuitry in processor 104 and external components such as external memory which receive write-back information.

In the foregoing description, the invention is described with reference to specific exemplary embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of claims, which in themselves recite only those features regarded as essential to the invention.

Thus, a novel method and apparatus for indicating the beginning of a write-back cycle has been described.

What is claimed is:

1. A data processor comprising:

an internal cache;

an update mode selector that selects one of a plurality of modes of updating an external memory that processes non-burst transactions; and a state machine coupled to the internal cache that controls data transfer in the processor, the state machine generating signals that indicate to the external memory that a predetermined number of individual data packet transfers comprise a single write-back transaction of one of a plurality of types.

2. The data processor of claim 1, wherein the signals comprise:

an indicator signal transferred to the external memory during a clock period preceding transfer of a first individual data packet of the single write-back transaction indicating that a following transaction is a write-back transaction involving a predetermined number of individual data packet transfers, the indicator signal deasserted after transfer of the first individual data packet;

a strobe signal transferred to the external memory during a clock period preceding each of the predetermined number of individual data packet transfers, the strobe signal initiating a memory write cycle of the external memory device;

a write/read signal transferred to the external memory that indicates a memory write operation in a first state and a memory read operation in a second state; and a hit/modified signal transferred to the external memory that indicates a hit in the internal cache to a modified line of data.

3. The data processor of claim 1, wherein the plurality of types of write-back transactions include a replacement write-back and an external snoop write-back.

4. The data processor of claim 3, wherein a replacement write-back is signaled to the external memory when the hit/modified signal is active, the write/read signal is in the first state and the indicator signal is active.

5. The data processor of claim 4, wherein a snoop write-back is signaled to the external memory when the hit/modified signal is inactive, the write/read signal is in the first state and the indicator signal is active.

6. The computer system of claim 1 wherein the plurality of modes comprises a write-through mode and a buffered write-through mode.

7. A method for processing multiple data packet write-back memory transactions in a non-burst mode, comprising the steps of:

generating and transmitting a first signal from an internal cache of a processor to an external memory that directs the external memory to begin a memory write cycle;

generating and transmitting a second signal from the internal cache to the external memory that directs the cache to treat a predetermined number of data packets as belonging to a same write-back transaction;

deactivating the second signal after a first memory write cycle; and generating and transmitting the plurality of data packets from the internal cache to the external memory after transmission of the second signal.

8. The method of claim 7, further comprising the steps of:

generating and transmitting a third signal from the internal cache to the external memory that indicates whether a subsequent transaction is a read or a write transaction; and generating and transmitting a fourth signal from the internal cache to the external memory that indicates that a hit has occurred in the cache to a modified line of data.

9. The method of claim 8, further comprising the steps of:

processing the predetermined number of data packets as belonging to a same replacement write-back transaction when the first signal is active, the second signal is active, the third signal indicates a write transaction and the fourth signal is active.

10. The method of claim 9, further comprising the steps of:

processing the predetermined number of data packets as belonging to a same snoop write-back transaction when the first signal is active, the second signal is active, the third signal indicates a write transaction and the fourth signal is inactive.

11. The method of claim 7, wherein the first signal is transmitted once for each data packet of the predetermined number of data packets.

* * * * *